(12) United States Patent
Turner

(10) Patent No.: US 7,498,685 B2
(45) Date of Patent: Mar. 3, 2009

(54) ELECTRICAL GENERATOR

(76) Inventor: Timothy John Emmanuel Turner, 22669 NE. Alder Crest Dr., Suite 202, Redmond, WA (US) 98053

( * ) Notice: Subject to any disclaimer, the term of this patent is extended or adjusted under 35 U.S.C. 154(b) by 73 days.

(21) Appl. No.: 11/591,168

(22) Filed: Nov. 1, 2006

(65) Prior Publication Data

US 2007/0102933 A1    May 10, 2007

Related U.S. Application Data

(60) Provisional application No. 60/735,145, filed on Nov. 9, 2005.

(51) Int. Cl.
F03B 13/12 (2006.01)
(52) U.S. Cl. .............................. 290/53; 290/42; 60/425
(58) Field of Classification Search ................... 290/42, 290/43, 53, 54; 60/495, 497
See application file for complete search history.

(56) References Cited

U.S. PATENT DOCUMENTS

| | | | |
|---|---|---|---|
| 4,034,231 A | 7/1977 | Conn et al. | |
| 4,110,630 A | 8/1978 | Hendel | |
| 4,185,464 A | 1/1980 | Rainey | |
| 4,206,601 A * | 6/1980 | Eberle | 60/398 |
| 4,208,877 A | 6/1980 | Evans et al. | |
| 4,228,360 A | 10/1980 | Navarro | |
| 4,260,901 A * | 4/1981 | Woodbridge | 290/42 |
| 4,425,510 A | 1/1984 | Jury | |
| 4,447,740 A | 5/1984 | Heck | |
| 4,539,485 A * | 9/1985 | Neuenschwander | 290/53 |
| 4,598,210 A | 7/1986 | Biscomb | |
| 4,622,473 A | 11/1986 | Curry | |
| 4,717,832 A | 1/1988 | Harris | |
| 4,849,647 A | 7/1989 | McKenzie | |
| 5,105,094 A | 4/1992 | Parker | |
| 5,136,173 A * | 8/1992 | Rynne | 290/53 |
| 5,311,064 A | 5/1994 | Kumbatovic | |
| 5,355,674 A | 10/1994 | Rosenberg | |

(Continued)

FOREIGN PATENT DOCUMENTS

CA        1198653        12/1985

(Continued)

OTHER PUBLICATIONS

Oregon State University, Oregon State University Conceptual Wave Park, published by Oregon State University, Feb. 2005.

*Primary Examiner*—Nicholas Ponomarenko
(74) *Attorney, Agent, or Firm*—Gregory W. Moravan

(57) ABSTRACT

An electrical generator having two generator components, namely a coil and a magnet. One of the generator components is attached to a fixed or buoyant pylon, and the other of the generator components is attached to a float that rises and falls in response to changes in the water level of a body of water. This causes relative motion between the two generator components and results in electrical power being generated by the coil. The buoyant pylon may be anchored by a flexible attachment to the bottom of the body of water. The float need not be coaxial with respect to the pylon. A single float may be used with more than one pylon and generator component. More than one float may be used with a particular generator component. Fixed pylons may also be used as a breakwater or as a support for a structure.

19 Claims, 3 Drawing Sheets

U.S. PATENT DOCUMENTS

| | | | |
|---|---|---|---|
| 5,374,850 A | 12/1994 | Cowen | |
| 5,411,377 A * | 5/1995 | Houser et al. | 417/333 |
| 5,424,582 A | 6/1995 | Trepl et al. | |
| 5,426,332 A | 6/1995 | Ullman et al. | |
| 5,461,862 A | 10/1995 | Ovadia | |
| 5,696,412 A * | 12/1997 | Woodbridge et al. | 310/15 |
| 5,696,413 A | 12/1997 | Woodbridge et al. | |
| 5,710,464 A | 1/1998 | Kao et al. | |
| 5,872,406 A | 2/1999 | Ullman et al. | |
| 5,921,082 A | 7/1999 | Berling | |
| 5,929,531 A | 7/1999 | Lagno | |
| 6,020,653 A * | 2/2000 | Woodbridge et al. | 290/53 |
| 6,091,159 A | 7/2000 | Galich | |
| 6,109,029 A | 8/2000 | Vowles et al. | |
| 6,216,455 B1 | 4/2001 | Dolch et al. | |
| 6,229,225 B1 | 5/2001 | Carroll | |
| 6,256,985 B1 | 7/2001 | Gardner et al. | |
| 6,476,512 B1 | 11/2002 | Rutta | |
| 6,515,375 B1 * | 2/2003 | Beal | 290/42 |
| 6,617,705 B1 | 9/2003 | Smalser et al. | |
| 6,700,217 B1 | 3/2004 | North et al. | |
| 6,717,284 B2 | 4/2004 | Lin | |
| 6,747,363 B2 | 6/2004 | Sanchez Gomez | |
| 6,772,592 B2 | 8/2004 | Gerber et al. | |
| 6,791,205 B2 | 9/2004 | Woodbridge | |
| 6,800,954 B1 | 10/2004 | Meano | |
| 6,849,963 B2 | 2/2005 | Grinsted et al. | |
| 6,860,219 B1 | 3/2005 | Dempster | |
| 6,864,592 B1 * | 3/2005 | Kelly | 290/42 |
| 7,075,190 B1 | 7/2006 | Lomerson, Sr. et al. | |
| 7,199,481 B2 * | 4/2007 | Hirsch | 290/42 |
| 7,298,054 B2 * | 11/2007 | Hirsch | 290/42 |
| 7,323,790 B2 * | 1/2008 | Taylor et al. | 290/42 |
| 2002/0155767 A1 | 10/2002 | Sung | |
| 2003/0001392 A1 | 1/2003 | Gerber et al. | |
| 2004/0071566 A1 | 4/2004 | Hill, Jr. | |
| 2005/0099010 A1 | 5/2005 | Hirsch | |

FOREIGN PATENT DOCUMENTS

| | | |
|---|---|---|
| CA | 1202227 | 3/1986 |
| CA | 2365289 | 4/2002 |
| CA | 2420998 | 9/2004 |
| CN | 1388318 | 1/2003 |
| FR | 2534320 | 4/1984 |
| GB | 189807129 | 0/1899 |
| GB | 190405740 | 0/1904 |
| GB | 191121239 | 0/1912 |
| GB | 191211731 | 0/1913 |
| GB | 191218101 | 0/1913 |
| GB | 191316106 | 0/1913 |
| GB | 154188 | 8/1921 |
| GB | 252930 | 6/1926 |
| GB | 260094 | 10/1926 |
| GB | 283327 | 1/1928 |
| JP | 54120341 | 9/1979 |
| JP | 60047884 | 3/1985 |
| JP | 07-019154 | 1/1995 |
| KR | 1980-0001714 | 12/1980 |
| KR | 1983-0001627 | 8/1983 |

* cited by examiner ically large load 27, such as an onshore electrical utility power grid
ELECTRICAL GENERATOR

CROSS REFERENCE TO RELATED APPLICATIONS

This application claims the benefit under 35 U.S.C. 119 (e) of U.S. Provisional Application No. 60/735,145 filed Nov. 9, 2005 for Electrical Energy Generation invented by Timothy John Emmanuel Turner.

BACKGROUND OF THE INVENTION

The electrical generator of the present invention relates to devices for generating electrical energy. More particularly, it relates to devices for generating electrical energy that are driven by wave or tidal action. Such devices are advantageous because they rely on a renewable resources (waves and the tides) to power them, they have no fuel costs, they consume no non-renewable resources for fuel, they emit none of the pollutants that are produced by conventional fossil fuel burning electrical generators, and they create none of the hazardous materials that are produced nuclear powered electrical generators.

DETAILED DESCRIPTION OF THE INVENTION

Figure 1:
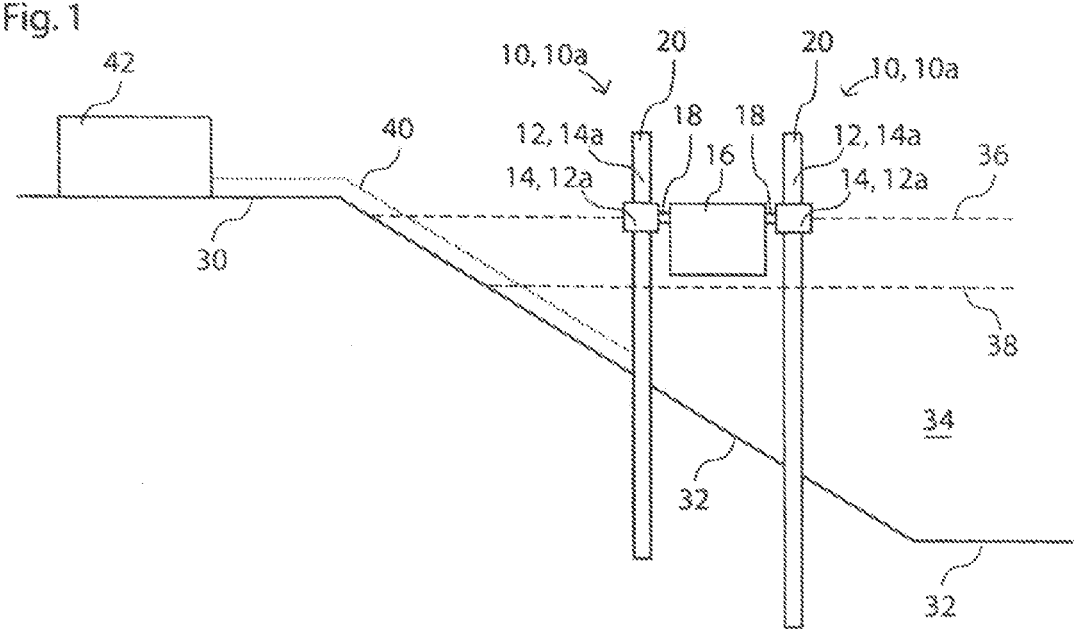
FIG. 1 is a diagrammatic side elevational view of two embodiments of the electrical generator of the present invention.
Figure 4:
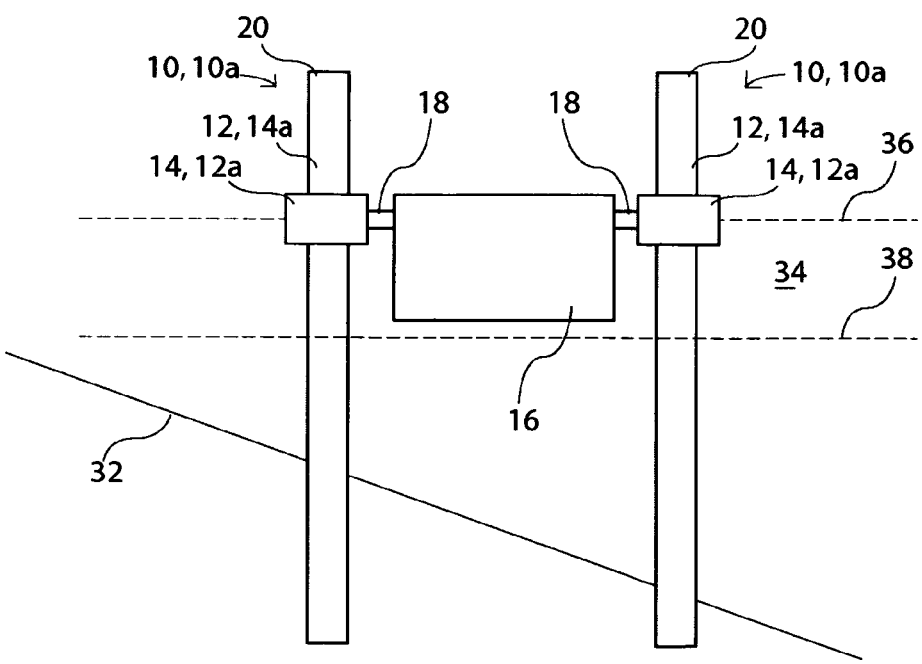
FIG. 4 is an enlarged, diagrammatic side elevational view of the two embodiments of FIG. 1.

Turning now to FIGS. 1 and 4, they illustrate an electrical generator 10 of the present invention. By way of example, the generator 10 is shown installed near a shore 30 of a body of water 34 having a bottom 32. The body of water 34 may have a high tide height 36, a low tide height 38, and waves. Alternatively, the generator 10 may be sited in any other suitable location in the body of water 34, rather than being located near the shore 30.

The generator 10 is scalable, in that both the size and number of the generators 10 may be varied to provide the amount of electricity required for any given need. For example, a single generator 10 may be used to provide power for a relatively small load 27, such as the warning lights on a buoy or a fixed pylon 20. Alternatively, two or more generators 10 may be combined to provide power for a relatively large load 27, such as an onshore electrical utility power grid 42 that supplies electricity to a city.

In its simplest form, the generator 10 may comprise a fixed pylon 20; an elongated, fixed electrical coil 12 attached to the fixed pylon 20; a float 16; and a moveable magnet 14 attached to the float 16. The elongated coil 12 passes through the magnetic fields (magnetic flux) generated by the magnet 14. Any suitable connection 18 may be used to attach a magnet 14 to a float 16.

During operation of the generator 10, tides and waves in the body of water 34 will cause changes in the water level of the body of water 34, thereby causing the float 16 to move up and down with respect to the fixed pylon 20. Such movement of the float 16 will be transported to the magnet 14 attached to it, and drive the magnet 14 (and its magnetic fields) to move up and down with respect to the fixed pylon 20 and the coil 12 attached to it.

Such relative motion between the magnetic fields produced by the magnet 14 and the coil 12 will induce an electrical current to flow in the coil 12, and cause electrical power to be generated by the coil 12. Because the motion of the magnet 14 is oscillatory, the induced current in the coil 12 alternates with a frequency related to the frequency of the tides and waves. Thus, the fixed coil 12 and moveable magnet 14 are the two generator components that actually generate the electrical power.

Any suitable output wiring 29 may carry the electrical power from the coil 12 to a power-handling unit 21.

In this embodiment of the generator 10, the coil 12 may be termed a fixed coil 12, since it is fixed in position by the fixed pylon 20 that it is attached to, and the magnet 14 may be termed a moveable magnet 14, since it moves with respect to the fixed coil 12.

As an alternative, a given float 16 may comprise part of two or more generators 10. For example, the float 16 illustrated in FIGS. 1 and 4 comprises part of two generators 10.

The theory of operation of the generator 10 will now be addressed. Tides and waves are able to vertically displace massive objects like cargo ships and other ocean going vessels, and are able to move massive amounts of water 34. The work done by buoyancy and gravity to move a floating object up and down can be used to generate electricity.

Accordingly, the generator 10 uses the tides and waves to cause a rising and falling motion of its float 16 that, in turn, causes relative motion between its magnet 14 and coil 12 to generate electricity.

Energy in tides and waves inherently includes kinetic and potential energy. For example, the kinetic energy in a wave depends on shuttle mass, wave frequency, and wave amplitude. When considering a geographic region with waves that have sinusoidal motion, constant frequency, and constant amplitude, an equation for power can be written as:

$$P = mA^2(2\pi f)^3 \qquad \text{Equation 1}$$

where P is power in watts, m is mass of the wave in kilograms, A is amplitude of the wave in meters, and f is frequency of the wave in Hertz. Power is proportional to mass, and its relationship to amplitude and frequency are square and cubic, respectively. Accordingly, relatively large amounts of power can be generated in various geographic regions with waves that have relatively high amplitude and frequency and in regions that have relatively large tidal variations.

Figure 2:
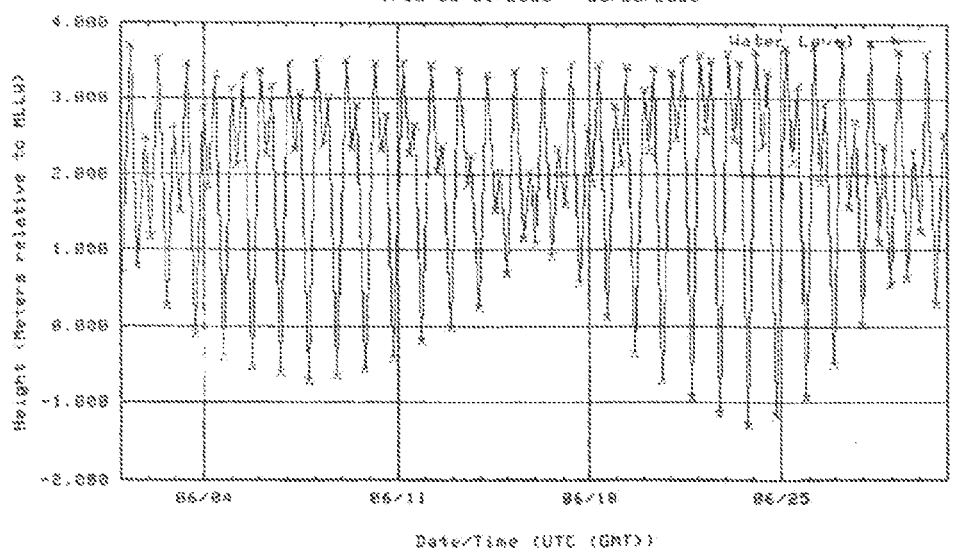
FIG. 2 is a graphical representation of the daily high and low tides for June 2005 in Seattle, Wash.

FIG. 2 is a graphical representation of the daily high and low tides for the month of June, 2005 in Seattle, Wash., and shows how water height changes with time. This change in the height of the water 34 can be used to calculate changes in potential energy. The equation for gravitational potential energy is:

$$U = mgh \qquad \text{Equation 2}$$

where m is mass in kg of the generator 10's float 16, connection 18 and magnet 14 being raised and lowered by the tide or by a wave, g is gravitational acceleration in m/s², and h is height in meters of the tide or wave that raises and lowers the generator 10's float 16, connection 18 and magnet 14 relative to its respective coil 12. Since g is generally constant for a given elevation, 9.8 m/s² at sea level, the amount of potential energy in the generator 10's float 16, connection 18 and magnet 14 is proportional to m and h. Accordingly, tides and waves with greater differences in height fluctuation, and a generator 10's float 16, connection 18 and magnet 14 that have greater masses, have greater changes in potential energy. The magnitude and frequency of changes in the potential energy of the generator 10's float 16, connection 18 and magnet 14 can serve, at least in part, as an indication of the amount of electrical power that can be generated by the generator 10.

For example, as the generator 10's float 16, connection 18 and magnet 14 move up against the force of gravity due to buoyancy and the motion of the water 34, the kinetic energy of the motion is transferred into potential energy and is used to overcome opposing forces such as frictional losses and the resistive force created when the magnetic fields generated by the magnet 14 pass across its respective coil 12 (i.e., magnetic resistive force). The magnetic resistive force is a function of, among other things, the strength of the magnetic fields, the number of turns of wire in the coil 12, and the relative speed between the magnetic fields and the coil 12. In general, the more magnetic resistance that can be overcome, the more electricity that can be produced. Accordingly, in general the more buoyant a generator 10's float 16 is, the more magnetic resistive force that can be overcome and the more current that can be produced by the generator 10. Similarly, in general the more mass a generator 10's float 16, connection 18 and magnet 14 have, the more magnetic resistive force that can be overcome by them when the surface of the water 34 goes down.

Figure 3:
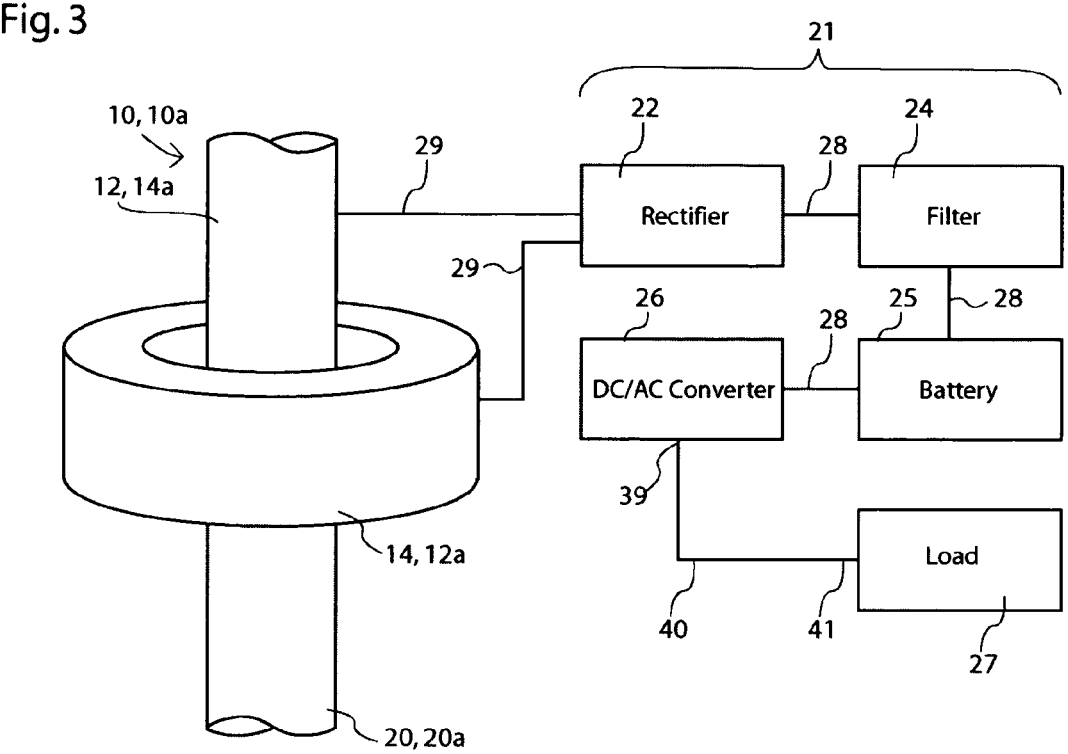
FIG. 3 is a diagrammatic view of a portion of the two embodiments of FIG. 1, and a schematic view of a power-handling unit that may be used with them.

Referring now to FIG. 3, the AC output power from the generator 10's coil 12 may be conveyed by the coil 12's output wiring 29 directly to the input end 39 of a transmission line 40 for a load 27. However, more typically the AC output power from the coil 12 may be conveyed by its output wiring 29 to any suitable electrical power-handling unit 21 that is capable of transforming it into any kind of AC or DC electrical power that may be desired by the user.

If there is more than one generator 10, then their respective coils 12 may be connected to a respective power-handling unit 21 by any suitable respective output wiring 29. More than one coil 12 may share any given power-handling unit 21, or any particular coil 12 may have its own individual power-handling unit 21.

Where AC power is desired, a power-handling unit 21 may comprise, for example, any suitable rectifier 22, filter 24, optional battery 25, and DC/AC converter 26, all wired together with any suitable wiring 28. If the battery 25 is not used, then any suitable wiring 28 may be used to connect the filter 24 directly to the DC/AC converter 26. The input end 39 of the transmission line 40 may be electrically connected to the output of the DC/AC converter 26.

On the other hand, where DC power is desired, a power-handling unit 21 may comprise any suitable rectifier 22, filter 24, and optional battery 25, all wired together with any suitable wiring 28. The input end 39 of the transmission line 40 may be electrically connected the battery 25; or, if no battery is used, it may be connected directly to the output of the filter 24.

A power-handling unit 21 may be protected from the environment in any suitable way, and may be located in any suitable place, such as inside, or on, a pylon 20 or float 16; or on the bottom 32 or shore 30 of a body of water 34.

A transmission line 40 may carry the AC or DC electrical power from a power-handling unit 21 to any desired load 27 that is connected to the output end 41 of the transmission line 40. Any particular power-handling unit 21 may have more than one transmission line 40; and any particular transmission line 40 may carry power from more than one power-handling unit 21.

A transmission line 40 may be routed in any suitable way from the power-handling unit 21 to the load 27, as desired by the user. For example, if there is an onshore facility that needs electrical power from a power-handling unit 21, such as a marina or city, then the load 27 to which a transmission line 40 may be connected may be the onshore facility itself, or it may be an onshore electrical utility power grid 42 to which the onshore facility may be connected. In such an event, the transmission line 40 may be routed from a power-handling unit 21, down a pylon 20, across or beneath the bottom 32 of a body of water 34, and to the on-shore load 27 in any suitable way, as desired by the user.

Alternatively, a transmission line 40 may carry the AC or DC electrical power from a power-handling unit 21 to any desired off-shore load 27 needing electrical power, such as a buoy, vessel, oil rig, or structure supported by the pylons 20. In such an event, the transmission line 40 may be routed from the power-handling unit 21, up a pylon 20 and to the offshore load 27 in any suitable way, as desired by the user.

A transmission line 40, may be designed to carry any desired high or low voltage AC or DC power; may be of any suitable construction and materials appropriate for its intended function, as desired by the user; and may be made of any suitable materials. A transmission line 40 may be insulated with materials that are resistant to the environment in which it is located.

A coil 12 may be attached to its respective pylon 20 in any suitable way. For example, a coil 12 may have the wires that form it partially or wholly rapped around, and attached to, the exterior its respective pylon 20; or a coil 12 may be formed as a sleeve that fits around, and is attached to, the exterior of its pylon 20. Any part of a coil 12 that is located exterior to its pylon 20 may be provided with any suitable protection from the environment.

Alternatively, a coil 12 may have the wires that form it be located partially or wholly within, and attached to, its respective pylon 20. This may be done in any suitable way. For example, a coil 12 may be partially or wholly integrally formed as part of its pylon 20, such as if its pylon 20 were cast from concrete, and the coil 12 was partially or wholly cast in place during the formation of its concrete pylon 20. Alternatively, a coil 12 may be partially or wholly located within, and attached to, the inside of a hollow portion of its pylon 20.

A coil 12 may be of any suitable construction and be selected according to the needs of the user. It may comprise many turns of wire arranged in any suitable fashion, such as in a spiral or helix. The turns of wire may be wrapped around a dielectric material, which may serve to increase the amount of current induced by any given amount of magnetic flux from its respective magnet 14. Current in the wire may be proportional to the number of turns of wire in a coil 12, with a larger number of turns generally increasing the amount of current produced. The wire in a coil 12 may be made of any suitable conductive material, such as copper or aluminum, to minimize resistance losses in the wire.

The operable length of a coil 12 may be selected to be at least about equal to any predetermined amount of change in the water level of the body of water 34 between a higher water level and a lower water level that the generator 10 may be designed to utilize, regardless of whether the water level is rising or falling. However, a coil 12's operable length may be selected to be lesser or greater than this amount. For example, a coil 12's operable length may be selected to be about equal a change in the water level of the body of water 34 that is equal to the maximum tidal range between the lowest and highest tides, plus the maximum wave height range from trough to peak that may be expected at the location for its respective pylon 20. By way of further example, if the maximum tidal range was 10 feet and if the maximum wave height range was 10 feet, then the coil 12's operable length may be selected to be at least about 20 feet; although it may be selected to be lesser or greater than this amount.

As seen in FIGS. 1 and 4, part of a magnet 14 may be located beneath the top surface of the body of water 34, regardless of the water level in the body of water 34 at that moment. Alternatively, a magnet 14 may be attached to its respective float 16 by its connection 18 in such a way that the magnet 14 is always entirely beneath, or is always entirely above, the surface of the body of water 34. Accordingly, the operable length of the coil 12 and where it is attached to its respective fixed pylon 20 may be selected to enable it to interact with its respective magnet 14 regardless of whether the magnet is always partially in the body of water 34, always entirely above the surface of the body of water 34, or always entirely below the surface of the body of water 34.

Accordingly, at a lowest selected water level, the bottom portion of a coil 12 may (or may not) be located beneath the top surface of the body of water 34, in order to be able to interact with its respective magnet 14. Similarly, at a highest selected water level, the top portion of a coil 12 may (or may not) be located beneath the top surface of the body of water 34, in order to be able to interact with its respective magnet 14.

As an alternative construction, instead of a particular coil 12 having a given desired operable length being used, a particular coil 12 may comprise at least two sub-coils 12, with the sub-coils 12 being arranged end to end, and having a combined length at least about equal to the given desired operable length. The sub-coils 12 may, or may not, be equal in length. Each sub-coil 12 may be electrically connected to a respective power-handling unit 21 by any respective suitable output wiring 29; or two or more sub-coils 12 may be electrically connected to the same power-handling unit 21. Alternatively, two or more of the sub-coils 12 may be electrically connected together in any suitable way, such as in series or parallel, and may be electrically connected to a respective power-handling unit 21 by any suitable output wiring 29.

The AC power generated by a coil 12 may be of a variety of frequencies, depending on how the coil 12's respective magnet 14 moves in response to the tides and waves. Regardless of its frequency, a rectifier 22 may efficiently convert the AC power generated by a coil 12 to DC power. A rectifier 22 may be of any suitable construction, such as a bridge or full-wave rectifier, and may be selected according to the needs of the user.

A filter 24 may be used to smooth the output of a rectifier 22. A filter 24 may be of any suitable construction, such as a filter capacitor, and may be selected according to the needs of the user.

As has been mentioned, a magnet 14 provides the necessary magnetic fields (magnetic flux) needed to induce current in its respective coil 12. A magnet 14 may be of any suitable construction and material, and may be selected according to the needs of the user. A magnet 14 may be provided with any suitable protection from the environment, such as a protective coating. A magnet 14 may be a one that is made from any suitable magnetic alloy, such as one containing neodymium. Alternatively, a magnet 14 may be an electromagnet. A magnet 14 may be provided with any suitable barrier, such as a screen or fence, that partially or wholly surrounds the magnet 14, to help prevent metallic or other debris from accumulating on the outer surfaces of a magnet 14.

A magnet 14 may be annular in shape. Alternatively, it may not be annular in shape, in the sense that it may not entirely encircle its respective coil 12. If a magnet 14 is at least partially or wholly annular in shape, then it may serve as a holder to hold itself and its respective coil 12 in a desired relationship with respect to each other during operation of a generator 10. Alternatively, or in addition, any other suitable holder to hold a magnet 14 and its respective coil 12 in a desired relationship with respect to each other during operation of a generator 10 may be provided. For example, a holder may comprise any suitable attachment between a float 16 and its respective pylon 20 that permits a float 16 to move up and down with respect to its respective pylon 20, and that keeps its respective magnet 14 in its desired relationship with respect to its respective coil 12.

As a further alternative, a particular magnet 14 may comprise at least two sub-magnets 14, which may be arranged and secured with respect to each other in any suitable way.

If a magnet 14 produces a strong magnetic field as compared to its volume, the amount of space required for a magnet 14 may be reduced, thereby allowing for more flexibility in configuring a generator 10. A magnet 14 may be oriented so that its magnetic field lines run vertically through its respective coil 12, and orthogonal to current induced in its coil 12.

A connection 18 between a magnet 14 and a float 16 may serve the purpose of attaching a magnet 14 to its respective float 16 so that the magnet 14 and its respective float 16 move as one piece as the float 16 rises and falls with the tides and waves. The connection 18 may be of any suitable construction, may be made of any suitable material that is resistant to the environment in which it is located, and may be selected according to the needs of the user. Alternatively, a separate connection 18 between a magnet 14 and a float 16 may not be provided, in which case a magnet 14 may be directly attached to its respective float 16, such as with any suitable adhesive; or a magnet 14 may be partially or wholly integrally formed as part of its respective float 16.

Although one connection 18 between a magnet 14 and its respective float 16 is illustrated, as an alternative more than one connection 18 may be provided between a magnet 14 and its respective float 16. As further alternatives, one connection 18 may be used to secure more than one magnet 14 to a respective float 16, and one or more connections 18 may be used to secure one magnet 14 to two, or more, respective floats 16.

A battery 25 may be used to store power generated by a generator 10 until it is needed, may be of any suitable construction, and may be selected according to the needs of the user. More than one battery 25 may be used. In such an event the batteries 25 may electrically connected together in any suitable way, such as in series or parallel, with any suitable wiring 28; and they may be electrically connected to the filter 24 and DC/AC converter 26 in any suitable way by any suitable wiring 28.

A DC/AC converter 26 is a device that receives DC power and produces AC power with a frequency and voltage that is compatible with existing power systems or electrically driven devices (e.g., converted to 60 Hz, 120 volts for power systems in the United States). The converter 26 may be of any suitable construction, and may be selected according to the needs of the user.

A float 16 may be of any suitable construction, may be made of any suitable material that is resistant to the environment in which it is located, and may be selected according to the needs of the user. A float 16 may be a non-annular float 16, in that it does not entirely encircle a respective pylon 20. Alternatively, a float 16 may be an annular float 16 that encircles a respective pylon 20.

As illustrated in FIGS. 1 and 4, a float 16 with its connections 18 and magnets 14 may be used with two pylons 20, along with their respective coils 12. Such use of a float 16 with at least two pylons 20 may offer the advantage of providing some measure of lateral stability for the float 16. As alternatives, a float 16 with its connection 18 and its magnet 14 may be used with only a single pylon 20 with its respective coil 12; or a float 16 with its connections 18 and magnets 14 may be used with more than two pylons 20 with their respective coils 12.

A float 16 may be configured to have a selected amount of buoyancy and mass to provide the desired performance characteristics for expected operating conditions. A float 16 may be configured in any suitable way to be adjustable in mass and buoyancy, which may be advantageous when expected operating conditions change seasonally, or otherwise. For example, a float 16 may be provided with any suitable fixed or adjustable floatation device, such as an air bladder. Alternatively, a float 16 may be provided with an internal chamber and with any suitable associated mechanism for selectively flooding and emptying the internal chamber with water.

A pylon 20 may be made of any suitable materials, such as concrete, treated wood or treated metals, for example, that are resistant to the environment in which they are located. The dimensions of a particular pylon 20, its physical characteristics, and the depth to which it is driven into the bottom 32 of the body of water 34 depend on the environmental factors of each proposed location, e.g. the composition of the bottom 32, wave frequency, water depth, water height fluctuations due to waves and tides, and ecology. Alternatively, a particular pylon 20 may be secured to the bottom 32 in any other suitable way. The dimensions, materials, construction and nature of a particular pylon 20 will also depend on the various functions to be served by that pylon 20, such as those discussed herein.

As has been mentioned, a power-handling unit 21 may be located inside, or on, a pylon 20 or a float 16. A pylon 20 or a float 16 may also be a convenient place to mount or house any suitable audio, visual or electronic warning device to ensure that passersby may be alerted to the presence of a pylon 20 or float 16, for safety reasons. A transmission line 40 may be used to connect the warning device to a power-handling unit 21.

A pylon 20 may serve one or more of a variety of other different functions, such as fixing the position of a coil 12, in order to permit a respective magnet 14 to move with respect to the coil 12; providing lateral support a float 16; providing a location for the interface of a power-handling unit 21 and a transmission line 40; and supporting and stabilizing the interface of a power-handling unit 21 and a transmission line 40.

Harbors, marinas, and other shoreline structures may be protected by breakwaters, which are often built from materials such as large concrete blocks and rocks. Their simple purpose is to remove energy from approaching waves. If there is more than one pylon 20, then one of the functions of the pylons 20 may be to serve as a breakwater, either alone or in combination with other breakwater materials. Additionally, the process of generating electricity by a respective generator 10 associated with each pylon 20 can also absorb energy from the waves (i.e., each generator 10 converts part of the wave energy into electricity). Accordingly, in some situations the pylons 20 and their associated generators 10 can generate electricity and can also be used to partially or wholly serve the function of a breakwater in protecting a shoreline.

A variety of water related structures (e.g., residential, commercial, industrial, or military), such an oilrig platform or a pier, are typically supported by pylons and require electricity. Accordingly, another function of the pylons 20 may be to serve as part or all of a support for another water related structure, allowing that structure to be partially or wholly built on top of a network of the pylons 20, while their associated generators 10 and power-handling units 21 may supply electrical power to that water related structure.

Another embodiment of the generator of the present invention is a generator 10$a$ that may comprise a fixed pylon 20; an elongated fixed magnet 14$a$ attached to the fixed pylon 20 in any suitable way; a float 16; and a moveable electrical coil 12$a$ attached to the float 16 in any suitable way, such as with a connection 18 between the coil 12$a$ and the float 16. The coil 12$a$ passes through the magnetic fields generated by the elongated magnet 14$a$. In a nutshell, the elongated coil 12 and magnet 14 of a generator 10 have been replaced, respectively, by an elongated magnet 14$a$ and a coil 12$a$ of a generator 10$a$.

A coil 12$a$ may be annular in shape; or it may not be annular in shape, in the sense that it may not entirely encircle its respective magnet 14$a$. If a coil 12$a$ is at least partially or wholly annular in shape, then it may serve as a holder to hold itself and its respective magnet 14$a$ in a desired relationship with respect to each other during operation of a generator 10. Alternatively, or in addition, any other suitable holder to hold a coil 12$a$ and its respective magnet 14 in a desired relationship with respect to each other during operation of a generator 10 may be provided. For example, a holder may comprise any suitable attachment between a float 16 and its respective pylon 20 that permits a float 16 to move up and down with respect to its respective pylon 20, and that keeps its respective coil 12$a$ in its desired relationship with respect to its respective magnet 14$a$.

As an alternative, a particular coil 12$a$ may comprise at least two sub-coils 12$a$, which may be arranged, electrically connected to each other, and secured with respect to each other in any suitable way; similar to what was discussed above regarding a coil 12 and its sub-coils 12.

As a further alternative, a particular magnet 14$a$ may comprise at least two sub-magnets 14$a$, which may be arranged and secured with respect to each other in any suitable way, similar to what was discussed above regarding a magnet 14 and its sub-magnets 12$a$.

It is understood that generators 10, 10$a$ and their various respective components are the same as each other, or are at least similar to each other, in any particular respect such as with respect to their respective mountings, locations, quantities (how many), sizes, shapes, designs, materials, compositions, constructions, manufactures, physical properties, dimensions, specifications, variations, operations, methods, and uses, except for those differences which will be made apparent by all of the disclosures herein.

During operation of the generator 10$a$, the waves and tides in the body of water 34 will cause the float 16 to move up and down with respect to the pylon 20. Such movement of the float 16 will be transported by the connection 18 to the coil 12$a$, and drive the coil 12$a$ to move up and down with respect to the magnet 14$a$.

Such relative motion between the coil 12$a$ and the magnetic fields produced by the magnet 14$a$ will induce an electrical current to flow in the coil 12$a$, and cause electrical power to be generated by the coil 12$a$. Because the motion of the coil 12$a$ is oscillatory, the induced current in the coil 12$a$ alternates with a frequency related to the frequency of the tides and waves. Thus, the coil 12a and magnet 14a are the two generator components that actually generate the electrical power. Any suitable output wiring 29 may carry the electrical power from the coil 12a to a power-handling unit 21.

With respect to the generator 10a, the magnet 14a may be termed a fixed magnet 14a, since it is fixed in position by the fixed pylon 20 that it is attached to, and the coil 12a may be termed a moveable coil 12a since it moves with respect to the fixed magnet 14a.

The operable length of a magnet 14a may be selected to be at least about equal to any predetermined amount of change in the water level of the body of water 34 between a higher water level and a lower water level that the generator 10 may be designed to utilize, regardless of whether the water level is rising or falling. However, a magnet 14a's operable length may be selected to be lesser or greater than this amount. For example, a magnet 14a's operable length may be selected to be about equal a change in the water level of the body of water 34 that is equal to the maximum tidal range between the lowest and highest tides, plus the maximum wave height range from trough to peak that may be expected at the location for its respective pylon 20. By way of further example, if the maximum tidal range was 10 feet and if the maximum wave height range was 10 feet, then the magnet 14a's operable length may be selected to be at least about 20 feet; although it may be selected to be lesser or greater than this amount.

Figure 5:
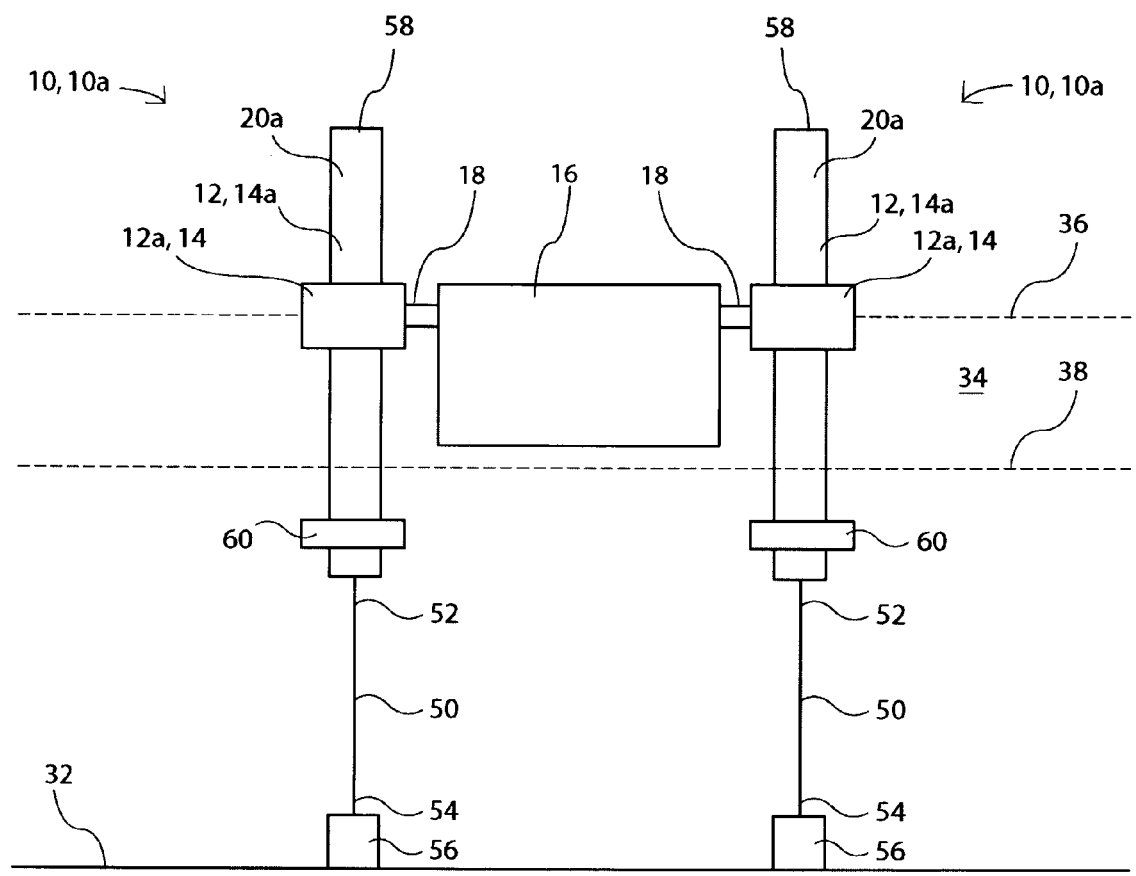
FIG. 5 is a diagrammatic side elevational view of another embodiment of the electrical generator of the present invention.

Turning now to FIG. 5, another embodiment of the present invention is illustrated that may be used with the generators 10, 10a. One potential problem associated with the generators 10, 10a, is that their fixed pylons 20 may be too expensive to use if the water in which the generators 10, 10a are to operate is relatively deep. This is because the cost of manufacturing and installing a fixed pylon 20 gets greater and greater as the water gets deeper and deeper.

A solution to this problem is to substitute a buoyant pylon 20a for a fixed pylon 20 of the generators 10, 10a. The buoyant pylon 20a may be anchored to the bottom 32 of the body of water 34 by using any suitable flexible attachment 50, such as a length of rope, chain or cable. An upper end 52 of an attachment 50 for a pylon 20a may be secured in any suitable way to the pylon 20a. The attachment 50 may comprise an anchor 56 (e.g., a weight 56), at its lower end 54 for anchoring the attachment 50 to the bottom 32. Alternatively, the attachment 50 may not have and anchor 56, and may have its lower end 54 anchored to the bottom 32 in any other suitable way. The buoyant pylon 20a and the attachment 50 each have a respective length, and their respective lengths may, or may not, be the same. The pylon 20a may be elongated.

The weight of an attachment 50 and its anchor 56 may be selected to be operable to at least partially orient its respective pylon 20a at least substantially vertically with respect to the top surface of the body of water 34. Alternatively, the pylon 20a may have a weight distribution that may be selected to be operable to at least partially orient its respective pylon 20a at least substantially vertically with respect to the top surface of the body of water 34. For example, a lower portion of the pylon 20a may be weighted to help serve this purpose.

The flexible attachment 50 and anchor 56 may be much cheaper to make and install than would be an equivalent length of a fixed pylon 20.

It is understood that pylons 20, 20a are the same as each other, or are at least similar to each other, in any particular respect such as with respect to their respective mountings, locations, quantities (how many), sizes, shapes, designs, materials, compositions, constructions, manufactures, physical properties, dimensions, specifications, variations, operations, methods, and uses, except for those differences which will be made apparent by all of the disclosures herein.

For example, a generator 10's coil 12, or a generator 10a's magnet 14a may be attached to a buoyant pylon 20a in any suitable way.

In general, the operation of the generators 10, 10a when used with a buoyant pylon 20a may be the same as, or at least similar to, their operation when used with a fixed pylon 20.

The length of a buoyant pylon 20a may be selected to be at least about equal to the operable length of its respective coil 12 or magnet 14a; although its length may be selected to be lesser than or greater than the operable length of its respective coil 12 or magnet 14a.

For example, the length of a pylon 20a may be selected to be at least about equal to any predetermined amount of change in the water level of the body of water 34, between a higher water level and a lower water level that the generator 10 may be designed to utilize, regardless of whether the water level is rising or falling. However, a pylon 20a's length may be selected to be lesser or greater than this amount. For example, a pylon 20a's length may be selected to be about equal a change in the water level of the body of water 34 that is equal to the maximum tidal range between the lowest and highest tides, plus the maximum wave height range from trough to peak that may be expected at the location for that pylon 20a. By way of further example, if the maximum tidal range was 10 feet and if the maximum wave height range was 10 feet, then the pylon 20a's length may be selected to be at least about 20 feet; although it may be selected to be lesser or greater than this amount.

The combined predetermined length of a pylon 20a and its respective attachment 50 may be selected so that at said lower water level at least a portion of, at least substantially all of, or all of the operable length of a pylon 20a's respective coil 12 or magnet 14a may located above the top surface of the body of water 34. The combined predetermined length of a pylon 20a and its respective attachment 50 may also be selected so that at said higher water level at least a portion of, at least substantially all of, or all of the operable length of a pylon 20a's respective coil 12 or magnet 14a may located below the top surface of the body of water 34.

The combined predetermined length of a pylon 20a and its respective attachment 50 may be selected so that at said higher water level the pylon 20a's top 58 may extend above the top surface of the body of water 34 a distance sufficient so that its respective coil 12a or magnet 14 may stay engaged with the pylon 20a; although their combined predetermined length may be selected to be lesser or greater than this amount. Alternatively, their combined predetermined length may be selected so that at said higher water level the pylon 20a's top 58 may be at the same level as the top surface of the body of water 34, or may be beneath the top surface of the body of water 34. As another alternative, a pylon 20a may further comprise any suitable stop for preventing its respective coil 12a or magnet 14 from disengaging from the pylon 20a during use of the generators 10, 10a.

The buoyancy of the pylon 20a may be selected to support the weight of the attachment 50, a respective coil 12 or magnet 14a, and the weight of its top portion 58 that may extend above the surface of the body of water 34 during use of a pylon 20a.

A buoyant pylon 20a may be of any suitable construction and made from any suitable materials that are compatible with the environment in which it is to be used. For example, part or all of the pylon 20a may be hollow, or may be made from any suitable buoyant material such as foamed plastic (e.g., Styrofoam). Alternatively, a pylon 20a may further comprise any suitable flotation device 60 to help provide the desired buoyancy. The flotation device 60 may be secured to, or integrally formed as part of, a pylon 20a.

In other words, although a buoyant pylon 20a will always have a buoyancy equal to the weight of the water that it displaces, it may not displace enough water to float itself, particularly when a maximum amount of its top portion 58 is above the surface of the body of water 34. Accordingly, the pylon 20a itself may be made more buoyant in any suitable way, such as by increasing its displacement, or it may further comprise any suitable flotation device 60 to help provide the desired buoyancy.

As has been mentioned, one important feature of the generators 10, 10a may be that the tides and waves that power them are renewable resources that may be used to generate power with low environmental impact. This may provide a distinct advantage over many current energy sources that rely on non-renewable fossil fuels, or that rely on nuclear power. Another feature of the generators 10, 10a may be their simplicity, since they have a relatively low number of moving parts. An advantage of this feature is that the generators 10, 10a may be relatively inexpensive to produce, install, and maintain. Still another feature of the generators 10, 10a may be that they may be used with a power-handling unit 21 that can provide electrical power that is compatible with existing power systems, which may be advantageous for replacing existing power generating equipment, or for selling power to various utilities.

From the foregoing, it will be appreciated that specific embodiments of the invention have been described herein for purposes of illustration, but that various modifications may be made without deviating from the invention. Additionally, aspects of the invention described in the context of particular embodiments may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention.

As used herein, except in the claims, the words "and" and "or" are each defined to also carry the meaning of "and/or".

In view of all of the disclosures herein, these and further modifications, adaptations and variations of the present invention will now be apparent to those of ordinary skill in the art to which it pertains, within the scope of the following claims.

What is claimed is:

1. An electrical generator; wherein said generator is located in a body of water having a top surface, a water level and a bottom; wherein said generator is operable to generate electrical power in response to a change in said water level; and wherein said generator comprises:

a buoyant pylon located in said body of water; a flexible attachment to anchor said buoyant pylon to said bottom of said body of water; a float carried by said body of water; two generator components; and a holder to hold said two generator components in a desired relationship with respect to each other;

wherein said two generator components comprise an electrical coil and a magnet having magnetic fields; wherein a first one of said two generator components is attached to said buoyant pylon; wherein a second one of said two generator components is attached to said float;

wherein said change in said water level causes relative motion between said float and said buoyant pylon, which in turn causes relative motion between said coil and said magnet and its said magnetic fields; and wherein said relative motion between said coil and said magnetic fields of said magnet causes electrical power to be generated by said coil.

2. The generator according to claim 1, wherein said generator is operable to utilize a predetermined amount of change in said water level between a higher water level and a lower water level; wherein said first one of said two generator components that is attached to said buoyant pylon has an operable length at least about equal to said predetermined amount of change in said water level.

3. The generator according to claim 2, wherein said buoyant pylon and said flexible attachment have a combined predetermined length that is selected to enable at least a portion of said operable length of said first one of said two generator components to be located above said top surface of said body of water at said lower water level, and to enable at least a portion of said operable length of said first one of said two generator components to be located below said top surface of said water at said higher water level.

4. The generator according to claim 2, wherein said buoyant pylon and said flexible attachment have a combined predetermined length that is selected to enable at least substantially all of said operable length of said first one of said two generator components to be located above said top surface of said body of water at said lower water level, and to enable at least substantially all of said operable length of said first one of said two generator components to be located below said top surface of said water at said higher water level.

5. The generator according to claim 1, wherein said flexible attachment is selected from the group consisting of rope, chain and cable.

6. The generator according to claim 1 wherein said flexible attachment comprises an anchor to anchor said flexible attachment to said bottom of said body of water.

7. The generator according to claim 1, wherein said buoyant pylon is elongated; wherein said flexible attachment has a weight, and wherein said weight is selected to be operable to at least partially orient said elongated buoyant pylon at least substantially vertically with respect to said top surface of said water.

8. The generator according to claim 1, wherein said buoyant pylon is elongated and has a weight distribution; and wherein said weight distribution is selected to be operable to at least partially orient said elongated buoyant pylon at least substantially vertically with respect to said top surface of said water.

9. The generator according to claim 1, wherein said float is not coaxial with respect to said buoyant pylon.

10. The generator according to claim 1, wherein there are at least two of said electrical generators; and wherein at least two of said electrical generators each comprise a common said float.

11. The generator according to claim 1, wherein said generator comprises at least two floats, and wherein said second one of said two generator components is attached to least two of said floats.

12. An electrical generator; wherein said generator is located in a body of water having a top surface, a water level and a bottom; wherein said generator is operable to generate electrical power in response to a change in said water level; and wherein said generator comprises:

a fixed pylon located in said body of water; a float carried by said body of water; two generator components; and a holder to hold said two generator components in a desired relationship with respect to each other;

wherein said two generator components comprise an electrical coil and a magnet having magnetic fields; wherein a first one of said two generator components is attached to said fixed pylon; wherein a second one of said two generator components is attached to said float;

wherein said change in said water level causes relative motion between said float and said fixed pylon, which turn causes relative motion between said coil and said magnet and its said magnetic fields; wherein said relative motion between said coil and said magnetic fields of said magnet causes electrical power to be generated by said coil; and wherein said float is not coaxial with respect to said fixed pylon.

13. The generator according to claim 12, wherein there are at least two of said electrical generators; and wherein at least two of said electrical generators each comprise a common said float.

14. The generator according to claim 12, wherein said generator comprises at least two floats, and wherein said second one of said two generator components is attached to at least two of said floats.

15. The generator according to claim 12, wherein there are at least two of said fixed pylons, and wherein at least two of said fixed pylons are arranged to be operable to serve as a breakwater.

16. The generator according to claim 12, wherein there are at least two of said fixed pylons, and wherein at least two of said fixed pylons are arranged to be operable to serve as a support for a structure.

17. An electrical generator; wherein said generator is located in a body of water having a top surface, a water level and a bottom; wherein said generator is operable to generate electrical power in response to a change in said water level; and wherein said generator comprises:

a fixed pylon located in said body of water; a float carried by said body of water; two generator components; and a holder to hold said two generator components in a desired relationship with respect to each other;

wherein said two generator components comprise an electrical coil and a magnet having magnetic fields; wherein a first one of said two generator components is attached to said fixed pylon; wherein a second one of said two generator components is attached to said float;

wherein said change in said water level causes relative motion between said float and said fixed pylon, which turn causes relative motion between said coil and said magnet and its said magnetic fields; wherein said relative motion between said coil and said magnetic fields of said magnet causes electrical power to be generated by said coil; wherein there are at least two of said electrical generators; and wherein at least two of said electrical generators each comprise a common said float.

18. The generator according to claim 17, wherein said float is not coaxial with respect to said fixed pylon.

19. The generator according to claim 17, wherein said generator comprises at least two floats, and wherein said second one of said two generator components is attached to at least two of said floats.

* * * * *